United States Patent [19]

Yuyama

[11] Patent Number: 5,261,091
[45] Date of Patent: Nov. 9, 1993

[54] SLIP PROCESSING APPARATUS FOR OUTPUTTING ARBITRARY FIELD DATA FROM A MEMORY AS INPUT DATA

[75] Inventor: Yoshiaki Yuyama, Hachioji, Japan
[73] Assignee: Casio Computer Co., Ltd., Tokyo, Japan
[21] Appl. No.: 587,007
[22] Filed: Sep. 24, 1990
[30] Foreign Application Priority Data Sep. 29, 1989 [JP] Japan ................. 1-254506
Jul. 26, 1990 [JP] Japan ................. 2-198152

[51] Int. Cl.⁵ ................................ G06F 15/403
[52] U.S. Cl. ................... 395/600; 395/149; 395/156; 395/166; 364/974.4; 364/225; 364/DIG. 1; 380/20
[58] Field of Search ......... 395/600, 197, 166, 149, 395/156; 364/401; 380/20

[56] References Cited

U.S. PATENT DOCUMENTS 4,805,099  2/1989  Huber ................. 364/300
4,835,735  5/1989  Ikegami et al. ........ 395/197
4,851,999  7/1989  Moriyama ............... 364/401

OTHER PUBLICATIONS

Korth & Silberschatz, *Database System Concepts*, McGraw-Hill (New York, 1986) pp. 45-105.

Primary Examiner—Thomas C. Lee
Assistant Examiner—Paul Lintz
Attorney, Agent, or Firm—Frishauf, Holtz, Goodman & Woodward

[57] ABSTRACT

A slip input apparatus which when retrieving an index record with abbreviation data input, permits an operator to easily and arbitrarily set which field of the index record is to be used to retrieve an index file, which field data in the retrieved index record is to be output, and which field data in the retrieved index record is to be fetched as input data. Accordingly, irrespective of the type of data entered in abbreviation, a user is allowable to output arbitrary field data or fetch arbitrary field data from a memory as input data.

1 Claim, 9 Drawing Sheets

FIG.1

| INPUT TABLE LABEL | TYPE | INDEX FILE | DISPLAY FIELD | ABBREVIATION FIELD |
|---|---|---|---|---|
| DATE | INPUT | | | |
| SLIP NO. | INPUT | | | |
| CLIENT NAME | ABBREVIATION | CLIENT | B | C |
| PERSON IN CHARGE | INPUT | | | |
| | | | | |
| CLIENT ADDRESS | ABBREVIATION | CLIENT | E | F |

FIG.2

CLIENT INDEX FILE

| A (CLIENT CODE) | B (CLIENT NAME) | C (ABBREVIATION NAME) | D (ADDRESS CODE) | E (ADDRESS) | F (NOTE) |
|---|---|---|---|---|---|
| 1101 | AAA INDUSTRY | aaa | 201 | TOKYO | --- |
| 1102 | aaA MANUFACT-URING Co. | aaa | 203 | OSAKA | --- |
| 1103 | aBB TRADING Co. | abb | 205 | OSAKA | --- |
| 1104 | Abb INC. | abb | 207 | CHIBA | --- |
| ∫ | ∫ | ∫ | ∫ | ∫ | ∫ |

FIG. 3

SALES SLIP

| DATE | SLIP No. | CLIENT NAME | PERSON IN CHARGE |
|---|---|---|---|
| x x x | x x x | — | |

| PRODUCT NAME | QUANTITY | UNIT PRICE | AMOUNT |
|---|---|---|---|
|  |  |  |  |

| ADDRESS | |
|---|---|

| ITEM LABEL | OUTPUT COORDINATE | TYPE | INDEX FILE | ABBREVIATION FIELD | DISPLAY FIELD | FETCH FIELD |
|---|---|---|---|---|---|---|
| A | (X1,Y1) | INPUT | / | / | / | / |
| B | (X2,Y2) | ABBREVIATION | M2 | b | c | e |
| C | (X3,Y3) | INPUT | / | / | / | / |
| ~ | ~ | ~ | ~ | ~ | ~ | ~ |

INPUT TABLE MEMORY 23

FIG. 8

26 INDEX FILE

| a | b | c | d | e |
|---|---|---|---|---|
| ak | | | | |
| base | | | | |
| cable | | | | |
| casio | | | | |
| cerem | | | | |

SALES SLIP

| A | B | C | D |
|---|---|---|---|
|   |   |   |   |

| E | F | G | H | I |
|---|---|---|---|---|
|   |   |   |   |   |

FIG.11

SALES SLIP

| A | B | C | D |
|---|---|---|---|
| xxxx | CA ▨ | 1. CABLE NETWORK Co.<br>2. CASIO COMPUTER Co. | |

| E | | | | I |
|---|---|---|---|---|
|   |   |   |   |   |

| | |
|---|---|
| (A) | x x x x |
| (B) | |
| (C) | |
| (D) | |
| (E) | |
| (F) | |
| (G) | |
| (H) | |
| (I) | |

FIG.12B

| | |
|---|---|
| (A) | x x x x |
| (B) | 1204 |
| (C) | |
| (D) | |
| (E) | |
| (F) | |
| (G) | |
| (H) | |
| (I) | |

FIG.13

| a | b | c | d | e |
|---|---|---|---|---|
| x x x | CABEL | CABEL NETWORK Co. | x x x | 1204 |
| x x x | CASIO | CASIO COMPUTER Co. | x x x | 1011 |

BUFFER MEMORY 28

SLIP PROCESSING APPARATUS FOR OUTPUTTING ARBITRARY FIELD DATA FROM A MEMORY AS INPUT DATA

BACKGROUND OF THE INVENTION

1. Field of the Invention

The present invention relates to a slip input apparatus for inputting slip data to be processed by a computer.

2. Description of the Related Art

In a conventional slip input apparatus for inputting slip data to be processed by a computer, the following two methods have been used in order to enter data for respective input items on a slip. In one method, data entered by an operator are directly used as input data for the input items. In the other method, input item data entered by an operator are used as key data for retrieving an index file, and data retrieved from the index file are used as input data for the input items.

In case of the former, the data entered by the operator is directly displayed on the slip format on a display. Also, the entered data is directly stored in a slip record corresponding to the slip. In case of the latter, on the other hand, the data entered by the operator is utilized to retrieve an index file so that data in a predetermined field within a record retrieved is displayed and code data corresponding to the field data is stored in a slip record corresponding to the slip.

In case of the latter, in each index record of the index file, it is programmed in advance which field is to be used as a data field for retrieval and which field is to be used as a data field for display. The types of data which can be entered as a candidate for retrieval and the types of data for display cannot be changed unless the program is changed. It is almost impossible for operators or users to change the program.

SUMMARY OF THE INVENTION

It is an object of the present invention to provide a slip input apparatus which permits an operator to easily set which field data in an index record is to be used to retrieve the index record in an index file and which field data is to be output in correspondence with an input item on a slip.

In order to achieve the above object, according to the present invention a slip processing apparatus for processing a slip comprised of plurality of input items, comprises: a file for storing a plurality of index records each comprising a plurality of data fields; an input section; a display section; a memory; means for displaying a format of the slip comprising a plurality of input items on said display section; means for arbitrarily setting, in said memory, a code representing a data field to be retrieved in the index record and a code representing a data field to be output for a specific input item among the input items, on the basis of an operation by an operator; means for inputting arbitrary data for each of said input items through said input section in accordance with said slip format displayed on said display section, on the basis of an operation of the operator; means for, when data is input for the specific input item, retrieving data in the field corresponding to the set code, among the index records within the file, and for extracting an index record whose field partly includes the input data; and means for displaying, on said display section, data in the field of the extracted index record to be output and corresponding to the set code, among the extracted records.

According to the present invention, therefore, it is possible to select an arbitrary index record within an index file preliminarily prepared for input items of a slip and obtain any desired field data from the index record for display on a corresponding input item of the slip. Moreover, the selection of the index record can be performed by an operator simply inputting part of the desired field data in the index record.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

A first embodiment of the present invention will be described with reference to FIGS. 1 through 5.

Figure 1:
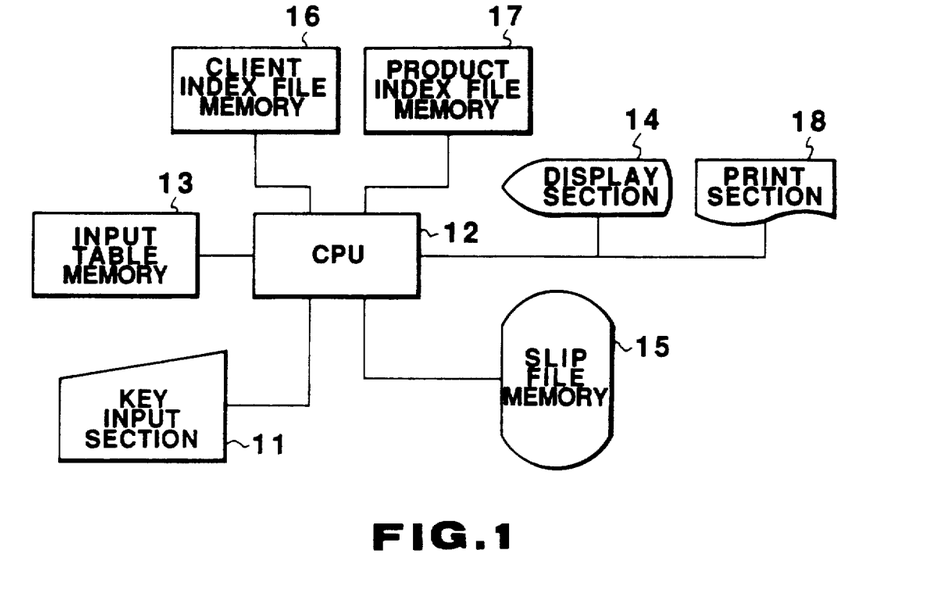
FIG. 1 is a block diagram showing a basic arrangement of a slip input processing apparatus.

FIG. 1 is a block diagram illustrating a basic arrangement of a slip processing unit.

A key input section 11 serves to input various types of data such as slip data, and commands. Data input from the key input section 11 are sent to a CPU 12 for processing.

The CPU 12 controls various operations of the slip processing apparatus in accordance with microprograms stored in advance. More specifically, at the time of system design by the user, upon receipt of definition data for defining the contents for processing, which correspond to input items on the slip that a user wants to design, through the key input section 11, the CPU 12 sets the input definition data in an input table memory 13.

In forming the slip, upon receipt of slip data entered from the key input section 11 which corresponds to each input item of the slip, the CPU 12 processes the slip data in accordance with the contents which have been set in the input table memory 13 in advance and performs a slip forming processing such as displaying the processed result on a display section 14 and writing the processed result into a slip file memory 15. In this case, the CPU 12 retrieves as needed a client index file memory 16 and a product index file memory 17 in accordance with the contents of the input table 13, thereby displaying retrieved data on the display section 14 and writing the retrieved data into the slip file memory 15.

Responsive to a slip print command from the key input section 11, the CPU 12 reads slip data from the slip file memory 15 and outputs it to a print section 18, thereby performing a slip issuing process for printing the slip data together with the slip format which the user has arbitrarily designed.

Figure 2:
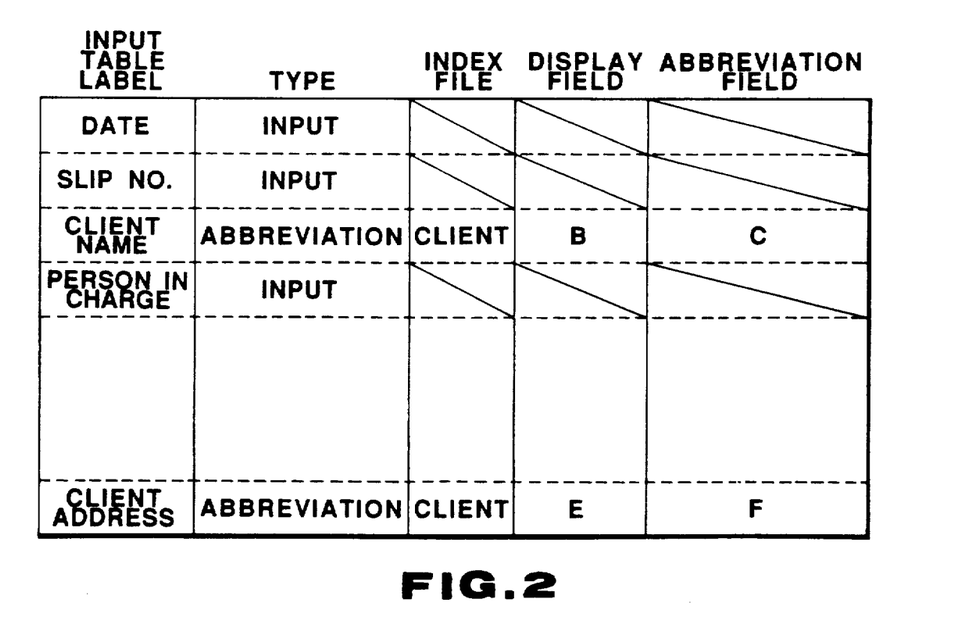
FIG. 2 illustrates an arrangement of the input table memory in FIG. 1.

FIG. 2 shows an arrangement of the input table memory 13.

The input table is arbitrarily set by a user. The table memory 13 is arranged such that "item label", "type of processing", "index file", "display field" and "abbreviation field" can be set for each of input items. The "item label" represents "date", "slip No.", "client name", "name of the person in charge", "client address" and so on. The "type of processing" represents "input", "abbreviation" and so on. Each of the "input" and "abbreviation" define that data is to be entered from the key input section 11. When the "input" is defined as the type of processing, data entered from the key input section 11 is received as input data as it is. When the "abbreviation" is defined, on the other hand, data entered from the key input section 11 is utilized to retrieve the client index file memory 16 or the product index file memory 17 so that data formed through the retrieval is used as the input data. Though not shown in FIG. 2, the type of processing may represent "calculation" which defines that an amount is to be calculated by "quantity x unit price".

Where the type of processing is "abbreviation", "index file" defines a name of the file to be retrieved. Furthermore, "display field" and "abbreviation field" are also defined when the type of processing is "abbreviation". More specifically, the "display field" defines which field data in index records forming an index file should be displayed on the display section 14. The "abbreviation field" defines which field should be used to retrieve the index records.

Figure 3:
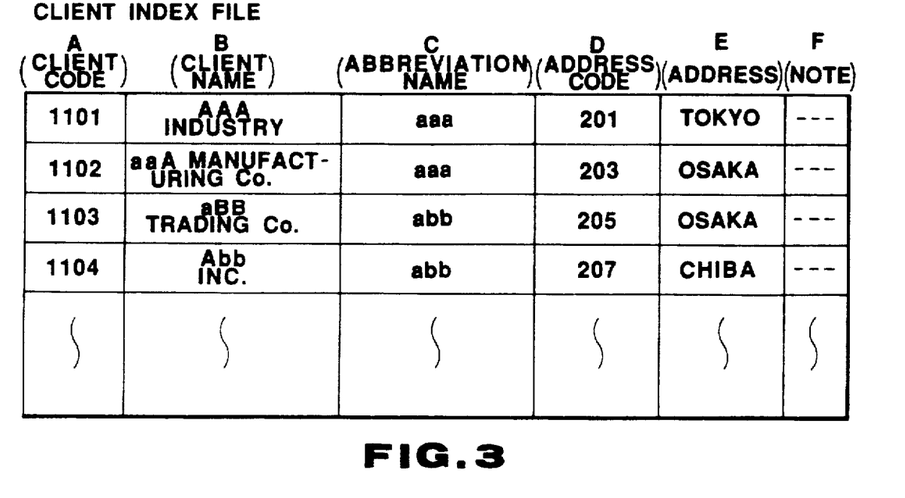
FIG. 3 illustrates an arrangement of a client index file memory in FIG. 1.

FIG. 3 illustrates an arrangement of the client index file memory 16.

The client index file memory 16 is arranged to store a number of records each containing "client name", "abbreviation name", "address code", "address" and "note" in correspondence with a "client code (numeric code)". The product index file memory 17 is also arranged to store index records each comprising a plurality of fields (product code, product name, etc).

An operation of the above embodiment will now be described with reference to FIGS. 4 and 5.

Assume now that the definition data as shown in FIG. 2 is preliminarily set in the input table memory 13 in designing a system. In correspondence with the "client name" of the item label, the "abbreviation", the "client index file", the "company name" and the "abbreviation name" are defined as the type of processing, the index file, the display field, and the abbreviation field, respectively. Furthermore, in correspondence with the "client address" of the item label, the "abbreviation", the "client index file", the "address", and "note" are defined as the type of processing, the index file, the display field, and the abbreviation field.

Figure 4:
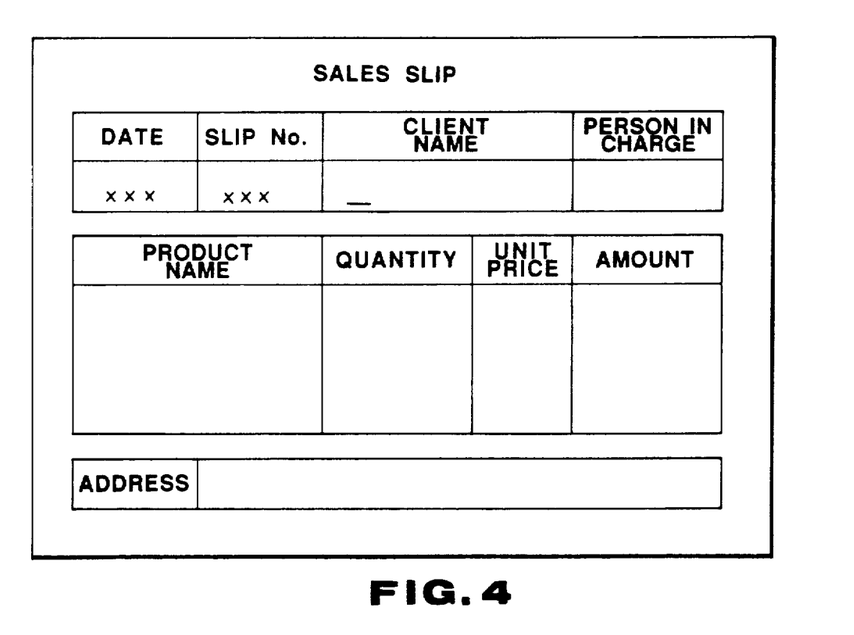
FIG. 4 illustrates a display example of a slip.

In response to a slip forming creating command from the key input section 11, the CPU 12 displays the slip format which has preliminarily and arbitrarily been prepared by a user on the display section 14 (refer to FIG. 4). The CPU 12 sequentially reads the definition data set in the input table memory 13 on an item-by-item basis and carries out processes corresponding to the contents of the definition data in sequence to form data corresponding to each input item of the slip. The CPU 12 writes the formed data into the slip file memory 15 and displays them on corresponding input items of the slip format on the display section 14.

Figure 5:
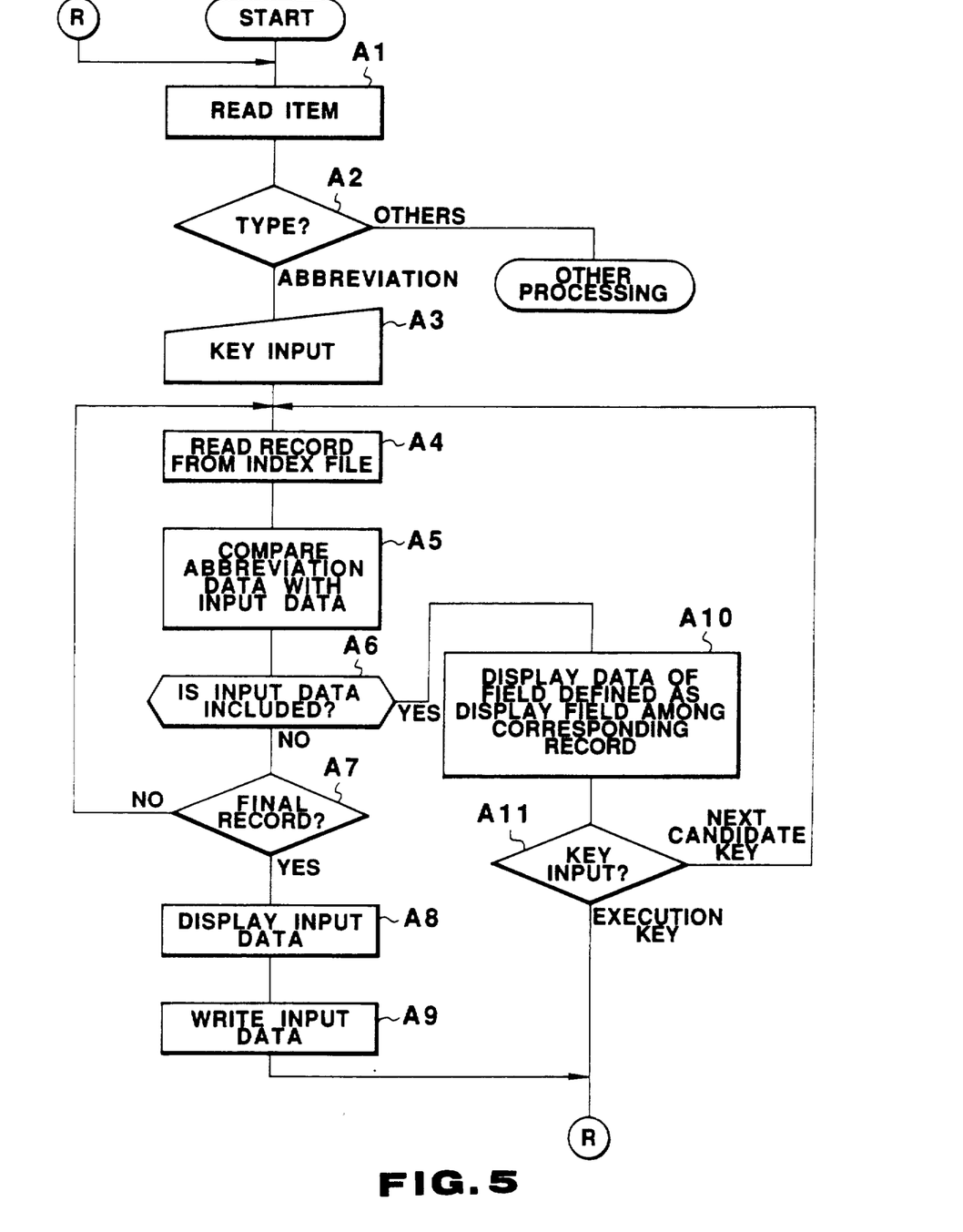
FIG. 5 is a flowchart illustrating an operation for slip data entry.

FIG. 5 is a flowchart showing the processing of the above slip.

First, the CPU 12 reads the contents of one item from the start of the input table memory 13 (step A1) and determines whether the type of processing in the read item is "abbreviation" or not (step A2). Since the type of processing in the first item is "input", other processing corresponding to the type is executed. In this case, since the first item defines the entry of date, upon the entry of the date data from the key input section 11, the CPU 12 writes the entered data into the slip file memory 15 and displays the entered date data on the date item of slip slip format shown in FIG. 4.

Next, the contents of the second item are read out from the input table memory 13. Since the type of processing of the second items is also "input", the same process as above is carried out.

Subsequently the contents of a third item are read out from the input table memory 13. The type of processing of the third item is detected to be "abbreviation" in step A2. In subsequent step A3, the CPU 12 waits its for the entry of abbreviation data from the key input section 11. When the abbreviation data (for example, "aa") is entered, the CPU 12 reads index record from the index file to be retrieved (step A4). According to the contents of the third item read from the input table memory 13, the "client index file" is defined as the index file. Thus, the client index file memory 16 is retrieved and the index record is read therefrom. In subsequent step A5, an abbreviation data in the index record read from the retrieved file is compared with the input abbreviation data. Subsequently, a determination is made as to whether or not the input abbreviation data is included in the abbreviation data in the index record (step A6). According to the contents of the third item, the "abbreviation name" is defined as the abbreviation field. Thus, the input abbreviation data is compared with the contents of the "abbreviation name" in the index record.

Assume now that "aa" that been input as the abbreviation data. This abbreviation data is included in the first record of the client index file memory 16, which is detected in step A6. Then the flow advances to step A10 where the CPU 12 displays on the display section 14 data of the field defined as the display field in the input table memory 13 among the corresponding records. The field defined in the display field in the input table memory 13 is the B ("client name"). Accordingly, data of "client name" i.e. "AAA Industry" is read from the first record in the client index file memory 16 and displayed on the area of input item of "client name". Then, the CPU 12 checks the key input state (step A11). If the displayed data is the data that the user wants, an execution key will be operated. If the displayed data is not desired, however, a next-candidate key will be operated. Then, the flow returns to step A4 where the next record data is read from the file to be retrieved. Subsequently, similar processings (steps A5 and A6) are performed.

As a result, data of the second record is read from the client index file memory 16. In this case, the input abbreviation data is also included in the second record. Thus, the flow advances to step A10 where data of the "client name" in the second record, i.e. "aaA Manufacturing Co. is displayed on the input item of the "client name". If the execution key is operated at this time, the flow returns to first step A1 where the CPU 12 designates the next item in the input table memory 13, and reads the contents thereof, thereby performing similar processing. Subsequently, the same processes as above will be carried out.

If the abbreviation data is input and if the abbreviation data is not included in the record read from the file to be retrieved, the flow advances to step A7 to determine whether or not the file to be retrieved has been read up to the final record. If the final record has not been read yet, the flow returns to step A4 where the next record is read out from the file to be retrieved. If the record including the input abbreviation data cannot be retrieved through the read operation of the file to be retrieved up to the final record, the flow advances to step A8. In step A8, the CPU 12 displays the input abbreviation data. Then, the flow advances to step A9. In step A9, the CPU 12 writes the input data into the slip file memory 15, and then returns to step A1.

Similar operations are repetitively performed up to the final item in the input table memory 13.

As described above, in the present embodiment, the abbreviation data may be set arbitrarily without being limited to a part of display data. For example, if the "abbreviation name" is defined as the abbreviation field as described above, the entry of "aa" as the abbreviation permits a record of "aaA Manufacturing Co." as well as a record of "AAA Industry" to be searched. Furthermore, if "a" is input as the abbreviation, records for "aBB trading Co." and "Abb Inc." can be searched. Similar results can be obtained when a client code is defined as the abbreviation field and a part of the client code, for example, "110", is input as the abbreviation.

A second embodiment of the present invention will now be described with reference to FIGS. 6 through 14.

In the first embodiment, in order to retrieve the index file by the input abbreviation, a field in the index record to be used for retrieving the index file, and field data in the retrieved index record are arbitrarily set. In the second embodiment, an arbitrary field is preliminarily set as a fetch field. Accordingly, arbitrary field data that a user desires can be fetched as the input data.

Figure 6:
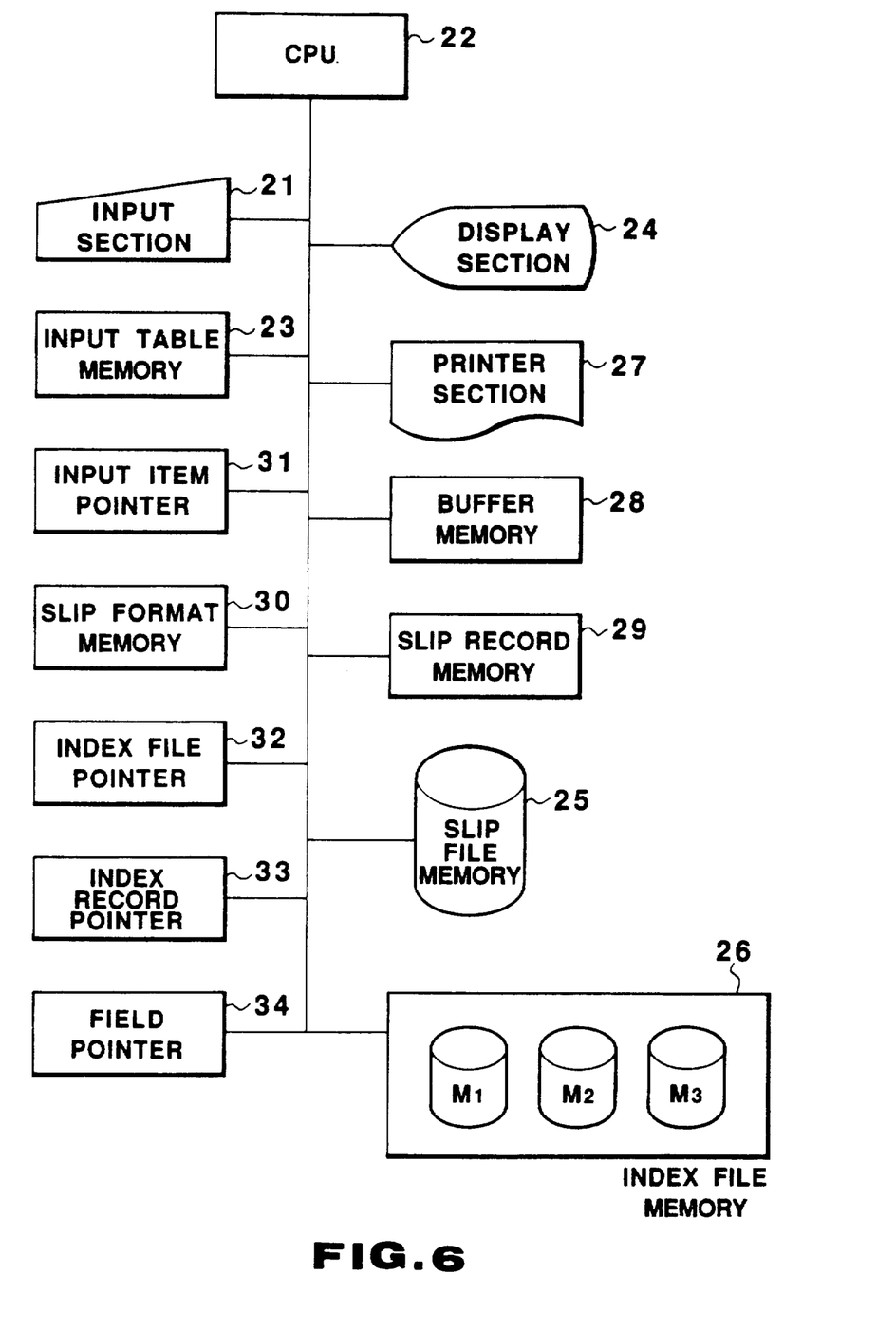
FIG. 6 is a block diagram showing a basic arrangement of the slip input processing apparatus.

FIG. 6 is a block diagram of a slip processing apparatus.

As is the case with the first embodiment, the slip processing apparatus includes a key input section 21, a CPU 22, an input table memory 23, a display section 24, slip file memory 25, an index file memory 26, and a print section 27. In addition, in the present embodiment, the slip processing apparatus has a buffer memory 28, a slip record memory 29, a slip format memory 30, an input item pointer 31, an index file pointer 32, an index record pointer 33 and a field pointer 34.

The index file memory 26 includes various types of index files Ml, M2, M3, such as a client index file, a product index file and so on. Responsive to the abbreviation data entered from the key input section 21, the CPU 22 selects a file to be retrieved, reads data of one record from the selected file and sets the index record in the buffer memory 28 when the entered abbreviation data is included in the index record.

The slip record memory 29 serves as a work memory for temporarily storing data to be fetched in the slip file memory 25, sequentially stores item data corresponding to the respective input items of a slip.

The slip format memory 30 stores a slip format arbitrarily designed by a user in advance. The slip format comprises data on ruled lines forming a table frame, labels for input items and so on.

The input item pointer 31 is a pointer used to set definition data in the input table memory 23 for each of data items and sequentially specify input items one by one when the processes corresponding to the contents set in the input table memory 23 are executed at the time of inputting slip data.

The index file pointer 32 is a file management pointer for selectively specifying a file to be retrieved among files in the index file memory 26.

The index record pointer 33 is a record management pointer for reading one by one index records from the file to be retrieved selectively specified by the index file pointer 32.

The field pointer 34 is a field management pointer for specifying a specific field in an index record read out by the index record pointer 33.

Figure 7:
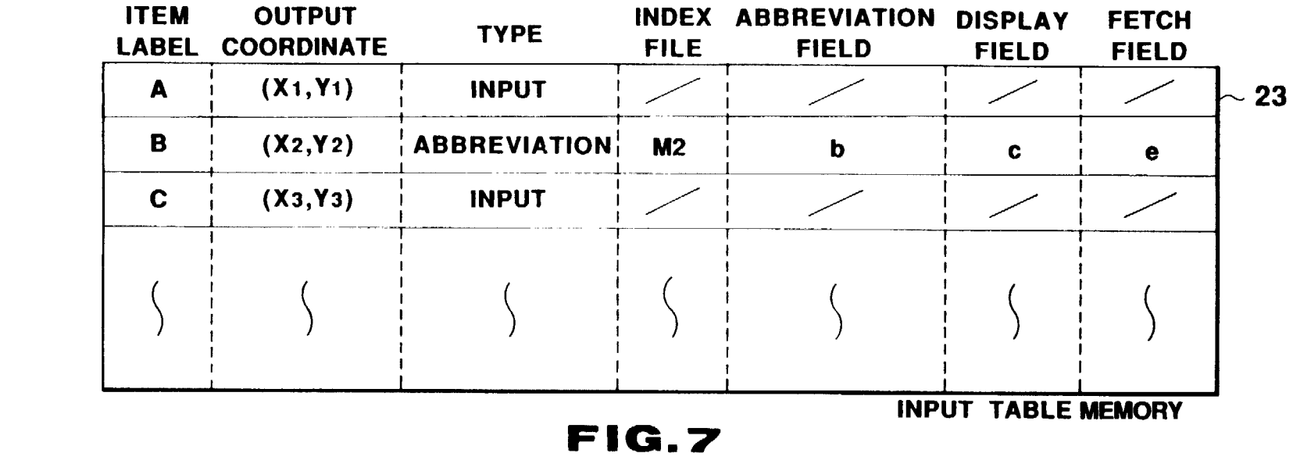
FIG. 7 illustrates an arrangement of an input table memory in FIG. 6.

FIG. 7 illustrates an arrangement of the input table memory 23. In addition to "item label", "type of processing", "index file", "abbreviation field" and "display field" as in the first embodiment, the input table memory 23 in the present embodiment is arranged to store "output coordinates" and "fetch field" for each of items. The "output coordinates" defines the display position of data on a display screen. The "fetch field" defines which field data in an index record is to be fetched in the slip file memory 25 as input data.

Figure 8:
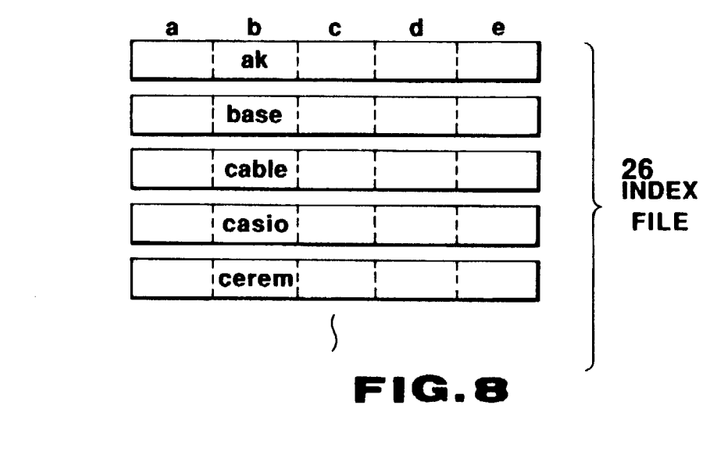
FIG. 8 illustrates a partial arrangement of an index file memory in FIG. 6.

FIG. 8 illustrates records in the index file memory 26 which stores a plurality of records each of which is comprised of a plurality of fields a, b, c, d and e.

An operation of the second embodiment will now be described with reference to FIGS. 9 through 14.

Figure 9:
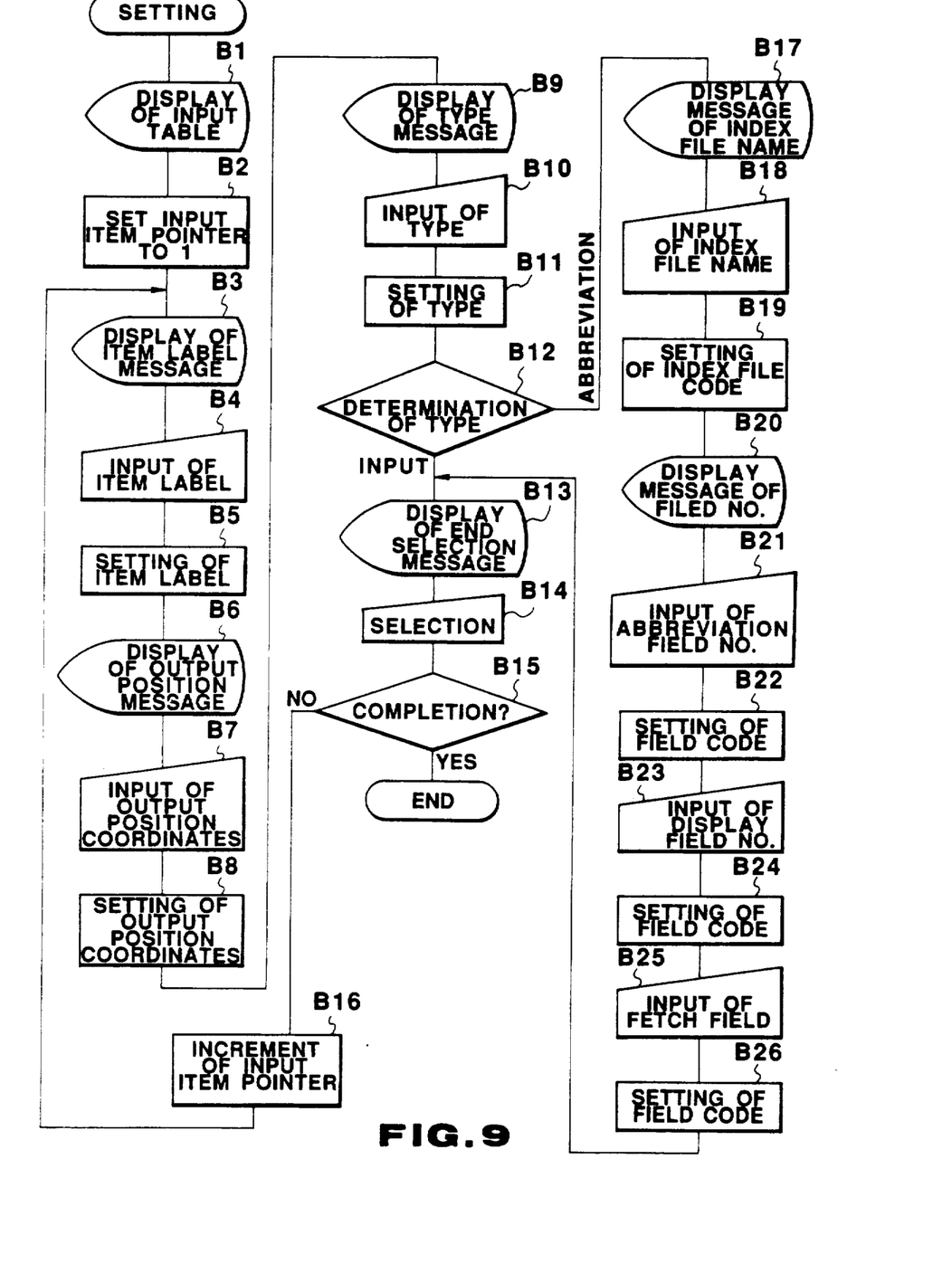
FIG. 9 is a flowchart illustrating a setting process of the input table memory.

FIG. 9 is a flowchart showing an operation of setting, in the input table memory 23, definition data for defining the process contents in correspondence with the respective input items of the slip.

First, the contents of the input table memory 23 are read out and displayed. Since the definition data is not specified initially, only the table format such as a table frame is displayed (step B1). An initial value of 1 is set in the input item pointer 31 (step B2).

When the above initialize process is completed, the flow advances to step B3 where a message is displayed to urge the user to enter an item label. As a result, the item label for the first item is entered through the key input section 21 (step B4). The data entered is set in the input table memory 23 in a row specified by the value of the input item pointer 31 (step B5).

Then, the flow advances to step B6 where a message is displayed to urge the operator to enter an output position through the key input section 21 (step B7), the input data on the output coordinates are set in the specified row of the input table memory 23 (step B8).

Subsequently, a message is displayed to urge the operator to enter "type of processing" (step B9). The operator enters data representing a type of processing in step B10. The data is set in the specified row of the input table memory 23 as the type data. In subsequent step B12, a determination is made as to whether the type of processing which has been set is "input" or "abbreviation".

Where the type of processing is "input", there is not need for further setting data to the item. Thus, the flow advances to step B13 in which a message for selecting of completion of operation is displayed. If the setting of definition data for one slip has been completed, then the operator inputs the completion of the setting operation through the key input section 21. Otherwise, the operator instructs the continuation of the setting operation (step B14). The continuation of the setting operation is detected in step B15. Then, the flow advances to step B16 where the value of the input item pointer 31 is incremented. Then, the flow returns to step B3.

The next row in the input table memory 23 is thereby specified. Then, data on "item label", "output coordinates" and "type of processing" are entered in sequence for an item corresponding to the specified row. They are set in sequence in the input table memory 23 (steps B3 to B11).

Assume now that "abbreviation" is set as the type of processing. The set of the "abbreviation" is detected in step B12, and the flow advances to step B17 where a message is displayed to urge the operator to enter the name of an index file. When the name of the index file is input in step B18, the input data is set in a specified row of the index file pointer 32 as an index file code (step B19).

Thereafter, a message is displayed to urge the operator to enter field Nos. for setting the abbreviation field, the display field and the fetch field (step B20). Assume that the field Nos. are input in the order of the abbreviation field, the display field and the fetch field.

First, to specify the abbreviation field, its field No. is entered in step B21. The entered field No. is set in a specified row of the input table memory 23 as an abbreviation field code (step B22). Next, to specify the display field, its field No. is entered in step B23. The entered field No. is set in a specified row in the input table memory 23 as a display field code (step B24). Furthermore, to specify the fetch field, its field No. is entered in step B25. The entered field No. is set in a specified row of the input table memory 23 as a fetch field code.

When the abbreviation field, the display field and the fetch field are set in this manner, the flow advances to step B13 in which a message for selecting completion of the setting operation is displayed. If, however, the continuation of the setting operation is selected, the flow advances to step B16 in which the input item pointer 31 is updated. Then, the flow returns to step B3, thereby sequentially repeating the similar processing on an item-by-item basis.

Upon completion of data setting for one slip, the completion of the setting operation is selected. (step B14), the setting process for the input table memory 23 is completed.

Figure 10:
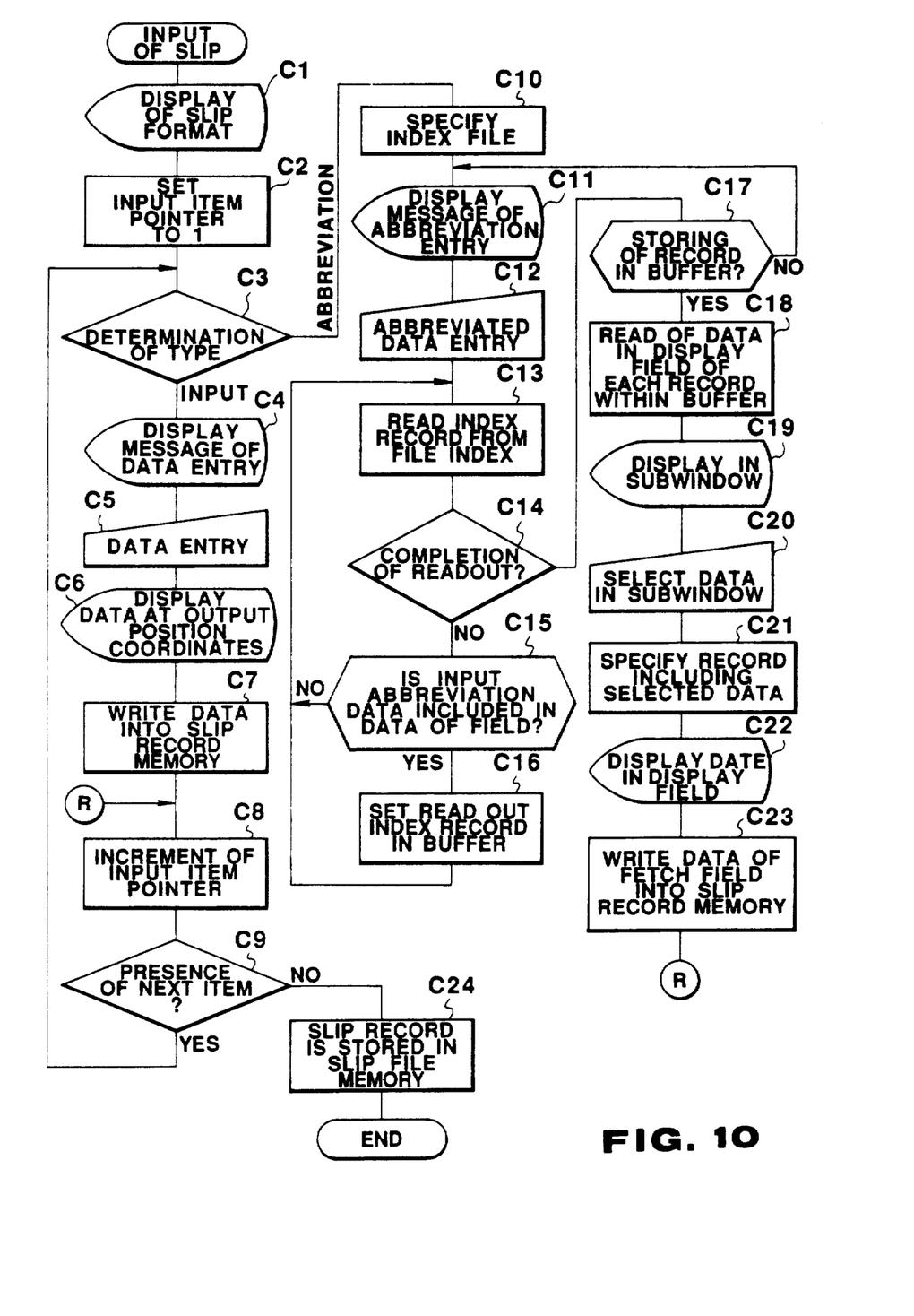
FIG. 10 is a flowchart showing a slip entry process.

FIG. 10 is a flowchart of a slip inputting process.

Figure 11:
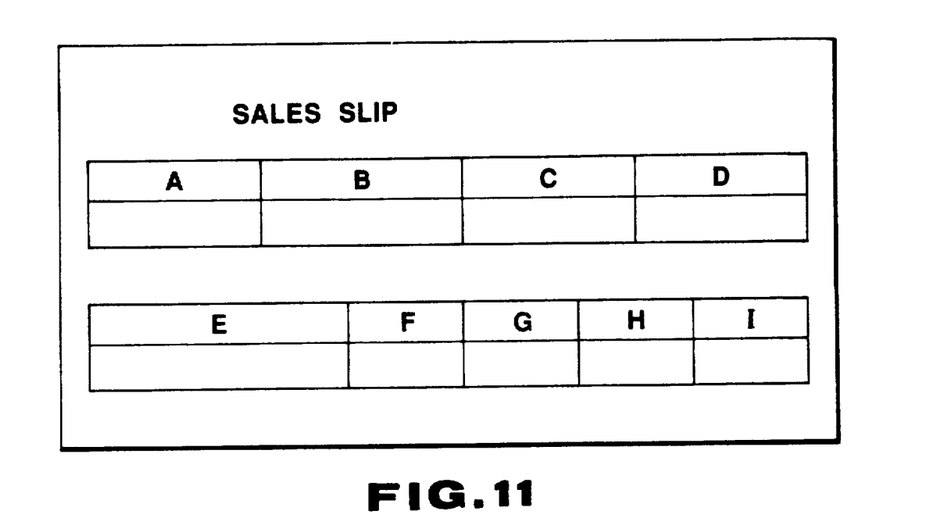
FIG. 11 illustrates a display example of a slip format.

First, the CPU 22 reads the slip format arbitrarily prepared by the user and display the format on the display section 24 (step C1). FIG. 11 illustrates a display example of the slip format. The slip format indicates a sales slip comprising input items A, B, C, ..., and I. The names of the items A, B, C, ..., and I as well ruled lines forming a table frame are displayed.

In step C2, the input item pointer 31 is set to an initial value of 1. Thereby, the first input item A is selected. In this date, data entry for the selected item is enabled.

The contents for one item are read from a row of the input table memory 23 corresponding to the value of the input item pointer 31 to determine whether the type of processing in the definition data is "input" or "abbreviation" (step C3).

If the type of processing in the definition data for the first item is "input", a message is displayed to urge the operator to enter data (step C4). When data is entered from the key input section 21 (step C5), the output coordinates for defining the output position on the display screen are extracted from the definition data for the first item and the input data is displayed in the position represented by the coordinates (step C6). Then, the input data is written into the slip record memory 29 (step C7).

Figure 12A:
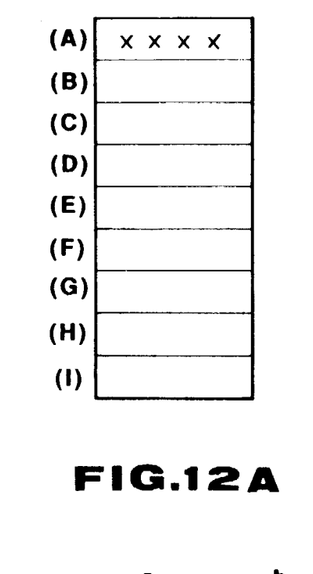
FIGS. 12A and 12B illustrate specific stored contents of the slip record memory 29 in FIG. 6.

FIG. 12A illustrates a state in which the input data has been written into a corresponding item area (A) of the slip record memory 29 as it is when the type of processing for the first item is "input".

Thereafter, the input item pointer 31 is incremented (step C8). A determination is made as to whether or not definition data has been set in the input table memory 23 represented by the value of the input item pointer 31, namely, whether or not the next input item is present (step C9). If present, the flow returns to step C3 in which the definition data of the next item is read from the input table memory 23 to determine its type of processing.

If the type of processing of the definition data for the second item is "abbreviation", then the flow advances to step C10 where an index file within the definition data is extracted and a file to be retrieved is specified. Then, a message is displayed to urge the operator to enter the abbreviation. When the abbreviation data is entered from the key input section 21 (step C12), data of one record is read from the start of the file to be retrieved represented by the index file pointer 32 (step C13), and a comparison is made between data defined as the abbreviation field in the index record read from the file to be retrieved and the entered abbreviation data (step C15). When the entered abbreviation data is found to be present in the abbreviation field data in the index record (step C15), the index record is set in the buffer memory 28 (step C16). Then, the flow returns to step C13 where the next record is read out from the file to be retrieved. The similar processing are repeated on a record-by-record basis up to the final record of the file to be retrieved.

Figure 13:
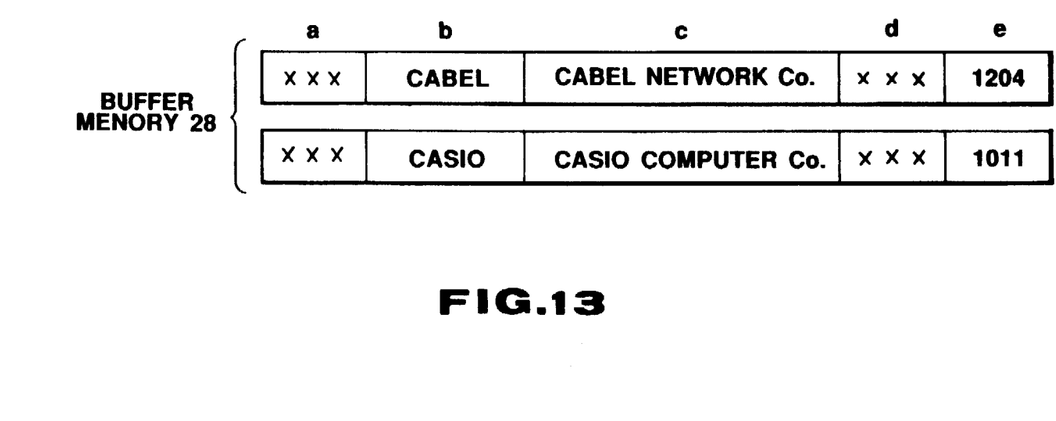
FIG. 13 illustrates specific stored contents of the buffer memory 28 in FIG. 6.

FIG. 13 illustrates a state in which two types of index records including the abbreviation data entered for the second item are present in the file to be retrieved and they are written into the buffer memory 28.

When all the records are read out from the file to be retrieved, and thus, the completion of readout is detected in step C14, the flow advances to step C17 to determine whether or not index records are stored in the buffer memory 28. If none of the index records an stored in the buffer memory 28, it is decided that abbreviation data has been entered erroneously. Then, the flow returns to step C11. As a result, a message is displayed again to urge the operator to enter the abbreviation data.

If index records are stored in the buffer memory 28, on the other hand, the index records are read out from the buffer memory 28 and data defined as the display field in the index records are read out (step C18). The display field data are displayed in a subwindow opened in a predetermined position on the display screen.

Figure 14:
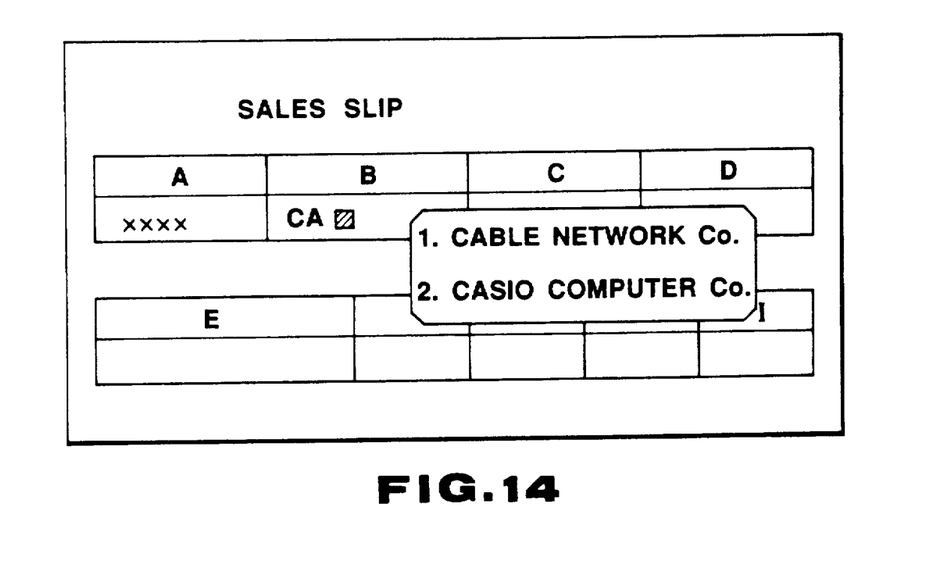
FIG. 14 illustrates a display example of a subwindow.

FIG. 14 illustrates a display example of the subwindow. In this example, the names of two companies "Cable . . . " and "Casio . . . " are displayed in the subwindow as candidates for the abbreviation data "CA" entered for the second item. Note that, in the figure, the hatched portion indicates the current position of a cursor.

When the operator selects desired data from the data being displayed in the subwindow (step C19), the index record containing the selected data is specified as the desired record (step C21). Then, data defined as the display field in the index record is displayed within a corresponding input item of the slip (step C22). Data defined as the fetch field in the index record is extracted and written into the slip record memory 29 (step C23).

Figure 12B:
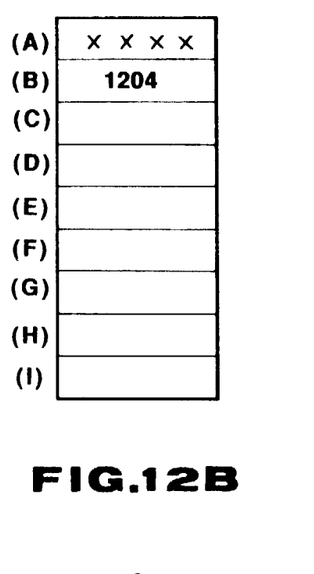

FIG. 12B illustrates a state in which data in the fetch field extracted from an index record (the first record in FIG. 14) arbitrarily selected by the user from among index records retrieved is written into the second item area (B) of the slip record memory 29 when the type of processing of the second item is the "abbreviation".

Then, the flow returns to step C3 in which the input item pointer 31 is incremented to specify the third item. The similar slip input processing as above is carried out for the third item.

In this manner slip data input processing is carried out while input items are specified in sequence item by item. The completion of the slip input processing for the last item is detected in step C9, and then the flow advances to step C24 in which data in the slip record memory 29 is stored in the slip file memory 25.

In the above embodiment, one display field and one fetch field are set for one input item. Alternatively, a plurality of display fields and a plurality of fetch fields may be set for one input item. In this case, it is necessary only to select a field to be displayed or to fetch from among display fields and fetch fields which are displayed as candidates on a display screen.

In the above embodiment, a plurality of candidates are displayed within a subwindow. Alternatively, the candidates may be displayed within a corresponding input item cyclically one at a time by use of a display switching technique so that a desired candidate may be selected from among them.

Additional advantages and modifications will readily occur to those skilled in the art. Therefore, the invention in its broader aspects is not limited to the specific details, representative devices, shown and described herein. Accordingly, various modifications may be without departing from the spirit or scope of the general inventive concept as defined by the appended claims and their equivalents.

What is claimed is:

1. A slip processing apparatus for processing a slip comprised of a plurality of item areas, said apparatus comprising:

(A) file storage means for storing a plurality of index files, each index file storing a plurality of index records, and each index record comprising a plurality of fields;

(B) table memory means for storing a plurality of item labels that respectively correspond one-to-one with said item areas of said slip, and for storing a file name that corresponds to a given item label and that indicates one of said index files, said table memory means further storing a first code indicating one of said fields in said one of said index files, and a second code indicating another one of said fields in said one of said index files;

(C) input means for inputting data corresponding to each of said item labels;

(D) determining means for, when data is input for one of said item labels, determining whether said one of said item labels is given item label;

(E) first displaying means, coupled to said determining means, for, if said one of said item labels is determined by said determining means not be said given item label, displaying said input data in the item area of said slip corresponding to said one of said item labels;

(F) reading means, coupled to said determining means and to said table memory means, for, if said one of said item labels is determined by said determining means to be said given item label, reading out from said table memory means said first and second codes, and the file name that corresponds to said given item label;

(G) retrieving means, coupled to said reading means and said file storage means, for retrieving data in said field which is indicated by said read-out first code, from said one of said index files which is indicated by said read-out file name;

(H) extracting means, coupled to said retrieving means, to said first storing means and to said input means, for extracting an index record whose data includes said input data; and (I) second displaying means, coupled to said extracting means and to reading means, for displaying in the item area corresponding to said given item label, data in said field which is indicated by said read-out second code, from said extracted index record.

* * * * *